(12) United States Patent
Higuchi et al.

(10) Patent No.: US 12,249,347 B2
(45) Date of Patent: Mar. 11, 2025

(54) CLAMP MEMBER AND HARD DISK DRIVE DEVICE

(71) Applicant: MINEBEA MITSUMI Inc., Nagano (JP)

(72) Inventors: Fumiyasu Higuchi, Kitasaku-gun (JP); Shigeya Abe, Kitasaku-gun (JP); Daisuke Ito, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/544,719

(22) Filed: Dec. 19, 2023

(65) Prior Publication Data

US 2024/0212712 A1   Jun. 27, 2024

(30) Foreign Application Priority Data

Dec. 26, 2022   (JP) ................................. 2022-208939

(51) Int. Cl.
*G11B 17/028*   (2006.01)

(52) U.S. Cl.
CPC ................................. *G11B 17/0284* (2013.01)

(58) Field of Classification Search
None
See application file for complete search history.

(56) References Cited

U.S. PATENT DOCUMENTS

| | | | | |
|---|---|---|---|---|
| 3,587,073 A * | 6/1971 | Ghose | ................ | G11B 17/038 346/137 |
| 5,528,434 A * | 6/1996 | Bronshvatch | .......... | G11B 17/02 360/99.12 |
| 6,028,739 A * | 2/2000 | Lindrose | .............. | G11B 17/038 360/99.12 |
| 6,624,967 B1 * | 9/2003 | Suwito | ............... | G11B 17/0287 360/98.08 |
| 6,690,637 B1 * | 2/2004 | Codilian | ............. | G11B 17/038 360/99.12 |
| 8,305,708 B2 * | 11/2012 | Tacklind | ............ | G11B 17/0287 360/99.12 |
| 2002/0071205 A1 * | 6/2002 | Koyanagi | ............ | G11B 17/038 |

(Continued)

FOREIGN PATENT DOCUMENTS

JP   2007-265542 A   10/2007

*Primary Examiner* — William J Klimowicz
(74) *Attorney, Agent, or Firm* — Chrisman Gallo Tochtrop LLC

(57) ABSTRACT

A clamp member is a disk-shaped member configured to fix a recording disk to a rotating part of a spindle motor. The clamp member includes a clamp lower surface, a plurality of first through holes, and a plurality of second through holes. The clamp lower surface is provided in an outer edge region of the clamp member, contacts an upper surface of the recording disk, and applies a downward force to the upper surface. The first through holes are provided at a first interval in the circumferential direction in a first region at an inner side in the radial direction from the outer edge region, and fastening members to be fastened to the rotating part are inserted into the first through holes. The second through holes are provided at a second interval in the circumferential direction in a second region at the inner side in the radial direction from the first region, and the fastening members are inserted into the second through holes.

9 Claims, 3 Drawing Sheets

(56) References Cited

U.S. PATENT DOCUMENTS

| | | | | |
|---|---|---|---|---|
| 2004/0012882 | A1* | 1/2004 | Kim | G11B 17/038 360/99.12 |
| 2004/0231133 | A1* | 11/2004 | Hanssen | G11B 17/0287 29/603.03 |
| 2005/0108744 | A1* | 5/2005 | Seomoon | G11B 17/028 |
| 2007/0230039 | A1* | 10/2007 | Koizumi | G11B 25/043 360/99.12 |
| 2009/0276796 | A1* | 11/2009 | Kuribayashi | G11B 17/0287 720/604 |
| 2014/0139950 | A1* | 5/2014 | Erlach | G11B 17/0287 360/99.12 |

* cited by examiner

CLAMP MEMBER AND HARD DISK DRIVE DEVICE

CROSS-REFERENCE TO RELATED APPLICATIONS

This application claims the benefit of priority to Japanese Patent Application Number 2022-208939 filed on Dec. 26, 2022. The entire contents of the above-identified application are hereby incorporated by reference.

TECHNICAL FIELD

The disclosure relates to a clamp member and a hard disk drive device.

BACKGROUND

JP 2007-265542 A discloses a technique for fixing a disk and a spacer to a spindle motor by using a clamp ring.

SUMMARY

A capacity of hard disk drive devices has recently been increasing as a trend. To increase the capacity of a hard disk drive device, for example, the thickness of the disk may be reduced, and the number of stacked disks may be increased.

Unfortunately, when the thickness of the disk is reduced, the rigidity of each disk decreases. This may cause, in fixing the disk to the spindle motor, the disk to be deformed (swelled in the circumferential direction or warped in the radial direction) due to the force applied from the clamp ring to the disk. When the disk is deformed, an error is likely to occur at the time of reading and writing data.

On the other hand, decreasing the force applied from the clamp ring to the disk makes it difficult to stably fix the disk to the spindle motor.

The disclosure has been made in view of the above problems, and an object of the disclosure is to provide a technique for suppressing deformation of a recording disk while stably fixing the recording disk to a spindle motor.

To achieve the object above, a clamp member according to the disclosure is a clamp member configured to fix a recording disk to a rotating part of a spindle motor and having a disk shape. The clamp member includes: a clamp lower surface provided in an outer edge region of the clamp member, contacting an upper surface of the recording disk, and configured to apply a downward force to the upper surface; a plurality of first through holes provided at a first interval in a circumferential direction in a first region at an inner side in a radial direction from the outer edge region; and a plurality of second through holes provided at a second interval in the circumferential direction in a second region at the inner side in the radial direction from the first region. Fastening members to be fastened to the rotating part are inserted into the first through holes, and the fastening members are inserted into the second through holes.

According to a base of the disclosure, a technique for suppressing deformation of a recording disk while stably fixing the recording disk to a spindle motor can be provided.

DESCRIPTION OF EMBODIMENTS

Figure 1:
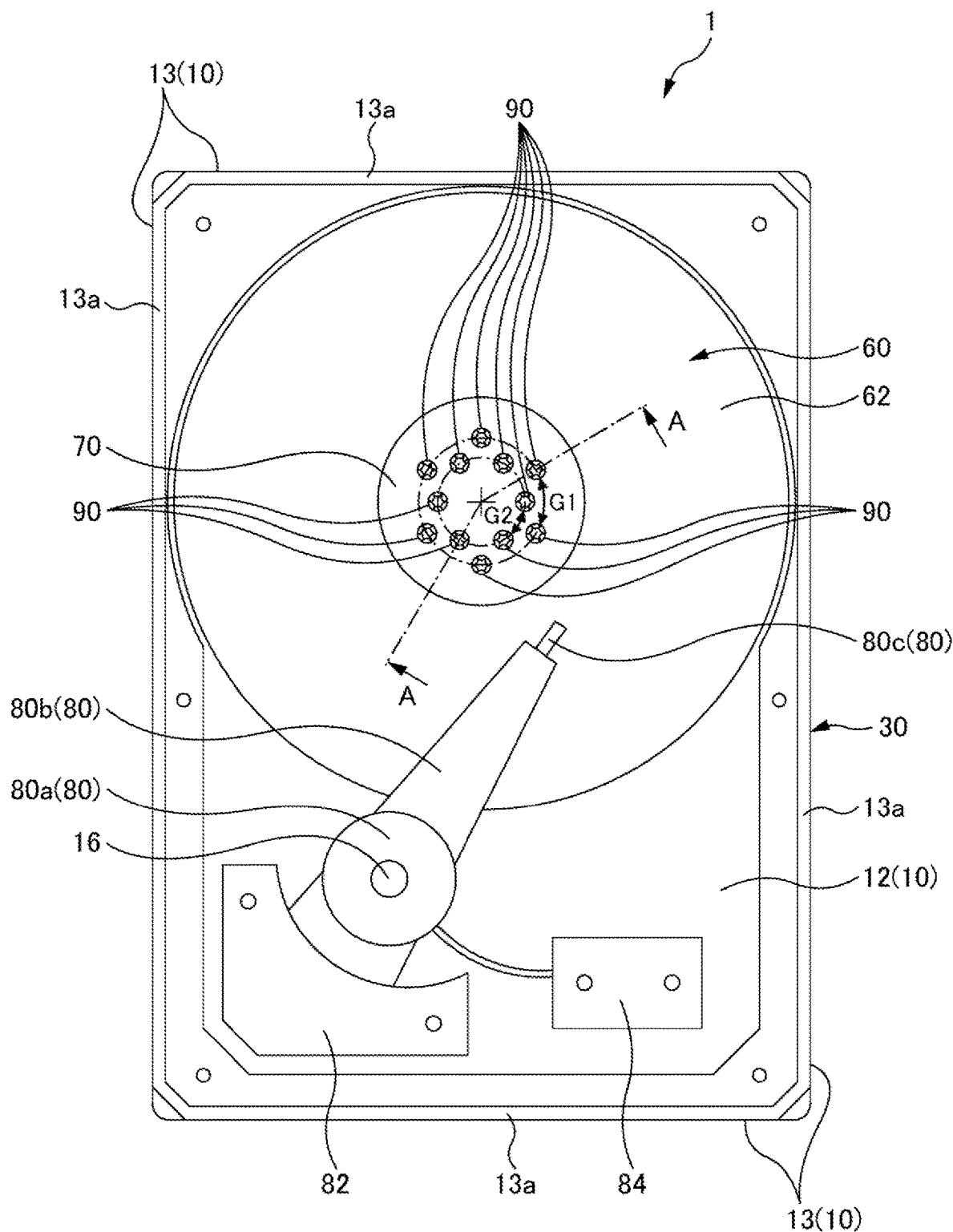
FIG. 1 is a plan view illustrating an example of a hard disk drive device according to the embodiment.

Hereinafter, the embodiment of the disclosure will be described with reference to the drawings. The same or equivalent components and members shown in the drawings are denoted by the same reference numerals, and duplicate description will be omitted as appropriate.

Figure 2:
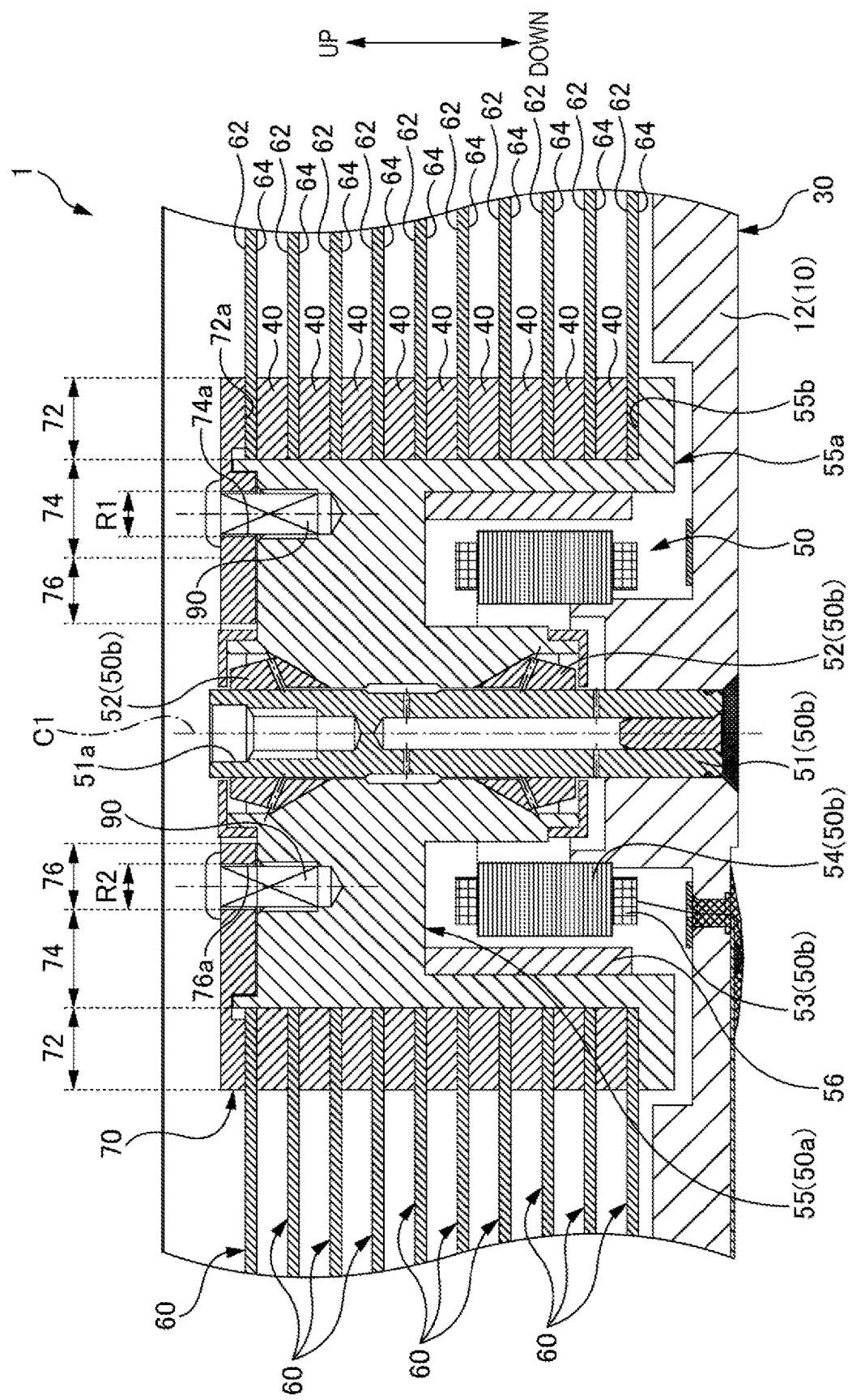
FIG. 2 is a cross-sectional view taken along line A-A in FIG. 1.

FIG. 1 is a plan view illustrating an example of a hard disk drive device 1 according to the embodiment. FIG. 2 is a cross-sectional view taken along line A-A in FIG. 1.

Hereinafter, a direction parallel to a center axis line C1 (FIG. 2) of a motor shaft 51 is defined as an axial direction. A direction perpendicular to the axial direction is defined as a radial direction. A direction around the center axis line C1 of the motor shaft 51 is defined as a circumferential direction. For convenience of description, the axial direction is defined as an up-down direction, and with respect to the motor shaft 51, a side of a bottom plate part 12 of a base 10 is defined as a bottom, and the opposite side is defined as a top. The up-down direction does not necessarily refer to the vertical direction. Therefore, depending on the installation location or orientation of the hard disk drive device 1, the up-down direction may be a horizontal direction, a vertical direction, or another direction.

Hard Disk Drive Device 1

As illustrated in FIGS. 1 and 2, the hard disk drive device 1 includes a housing 30, a spacer 40, a spindle motor 50, a recording disk 60, a clamp member 70, an access part 80, a voice coil motor 82, a connector 84, and screws 90.

The housing 30 includes a base 10 and a cover (not illustrated) attached to the base 10.

As illustrated in FIG. 1, the base 10 includes a bottom plate part 12 and a side wall part 13. The base 10 is a box-shaped member with a bottom and an open upper surface of a substantially rectangular parallelepiped, and is manufactured by die casting a metal such as aluminum.

The bottom plate part 12 is a part disposed at a lower side of the base 10 and having a rectangular plate shape having short sides and long sides. The bottom plate part 12 May have a square plate shape with four sides having the same length. The bottom plate part 12 is provided with a pivot shaft 16 extending in the up-down direction. The pivot shaft 16 is a component made of metal having a cylindrical shape and is fixed to one area of the bottom plate part 12 by press fitting, for example. The pivot shaft 16 May be formed integrally with the bottom plate part 12 by casting or the like.

The side wall part 13 is a plate-shaped part extending in a direction orthogonal (that is upward) to the bottom plate part 12 along an entire circumference of the bottom plate part 12. The side wall part 13 includes, at the upper end of the side wall part 13, a side wall upper surface 13a as a surface facing upward. A cover is fixed to the side wall upper surface 13a using screws.

The cover is a plate-shaped member closing the open surface of the base 10. Sealing means (not illustrated) is provided between the cover and the side wall upper surface 13a. This forms the housing 30 having a completely sealed interior space.

The interior space of the housing 30 is filled with helium gas as a gas having a density lower than the density of air. The interior space may be filled with, for example, nitrogen gas or a mixed gas of helium and nitrogen. The interior space can contain another gas having a density lower than the density of air. Air may be contained in the interior space. The spacer 40, the spindle motor 50, the recording disk 60, the clamp member 70, the access part 80, the voice coil motor 82, the connector 84, and the screws 90 are accommodated in the interior space.

The recording disk 60 is a disk-shaped member having a through hole in the central part. The recording disk 60 has a disk upper surface 62 facing upward and a disk lower surface 64 facing downward. A plurality of the recording disks 60 are provided and supported by a rotor 55 of the spindle motor 50 with the recording disks 60 separated from each other in the up-down direction by the spacer 40. A predetermined gap in the up-down direction is formed between each of the recording disks 60 by the spacer 40. With the recording disks 60 supported by the rotor 55, the disk upper surface 62 of one recording disk 60 and the disk lower surface 64 of another recording disk 60 adjacent to this recording disk 60 are opposed to each other.

The recording disk 60 is, for example, 0.5 mm thick. The recording disk 60 May have a thickness less than 0.5 mm, for example, thicknesses of 0.1 mm, 0.2 mm, 0.3 mm, and 0.4 mm.

As illustrated in FIG. 2, ten recording disks 60 are provided as an example. More than ten recording disks 60 May be provided.

The access part 80 is supported by the pivot shaft 16 and performs recording of data on the recording disk 60 and reading of data recorded on the recording disk 60. Specifically, the access part 80 includes a bearing device 80a, a swing arm 80b, and a magnetic head 80c.

The bearing device 80a is attached to the pivot shaft 16 and swingably supports a plurality of swing arms 80b disposed in the gap between the respective recording disks 60. The magnetic head 80c is disposed at a tip part of the swing arm 80b. The magnetic head 80c is a member for imparting magnetism to the recording disk 60 and reading magnetism from the recording disk 60. The voice coil motor 82 is electrically connected to a printed circuit board (not illustrated) via the connector 84. The voice coil motor 82 supplies a driving force to the swing arm 80b. This positions the magnetic head 80c with respect to the recording disk 60.

When the rotor 55 of the spindle motor 50 rotates, the recording disk 60 also rotates. In the state, when the swing arm 80b swings, the magnetic head 80c moves between the rotating recording disks 60. The magnetic head 80c imparts magnetism to the recording disk 60 and reads magnetism from the recording disk 60. This allows the magnetic head 80c to record data on the recording disk 60 and read data recorded on the recording disk 60.

Spindle Motor 50

The spindle motor 50 is used for the hard disk drive device 1. The spindle motor 50 includes a stationary part 50b supported by the base 10 and a rotating part 50b configured to rotate with respect to the stationary part 50b.

As illustrated in FIGS. 1 and 2, the stationary part 50b includes a region of the bottom plate part 12 of the base 10, the motor shaft 51, a bearing member 52, a coil 53, and a stator core 54. The rotating part 50a includes the rotor 55 and a rotor magnet 56.

The motor shaft 51 is a component made of metal having a cylindrical shape and is fixed to a region of the bottom plate part 12 by press fitting or the like as illustrated in FIG. 2. An upper end part of the motor shaft 51 has a screw hole 51a. By a male screw (not illustrated) being screwed into a female screw formed in the screw hole 51a, the cover is fastened to the motor shaft 51.

A pair of bearing members 52 having a conical shape are fixed to an outer peripheral surface of the motor shaft 51, and the rotor 55 is rotatably supported at the pair of bearing members 52. The motor shaft 51 is inserted inside the rotor 55 in the radial direction, and the rotor 55 is opposed to the motor shaft 51 and the pair of bearing members 52 with minute gaps.

The minute gaps between the rotor 55 and the pair of bearing members 52 are filled with lubricant (not illustrated) to form so-called fluid dynamic bearings.

The rotor 55 is a disk-shaped member in a plan view, and has a through hole where the motor shaft 51 is inserted at the center in the radial direction. The inner diameter of the through hole is substantially equal to the outer diameter of the motor shaft 51. A flange part 55a is provided at an outer edge and a lower end of the rotor 55. The flange part 55a is a flange-shaped part protruding outward in the radial direction from the lower end of the rotor 55. The flange part 55a extends in a disk shape over the entire circumference in the circumferential direction. The flange part 55a has a flange upper surface 55b facing upward. The flange upper surface 55b is in contact with the disk lower surface (lower surface) 64 of the recording disk 60 located at the lowermost position. The recording disks 60 are stacked above the flange part 55a via the spacer 40 (see FIG. 2). This allows the flange part 55a to support the recording disk 60 from below. In the present embodiment, the flange upper surface 55b is formed flat.

As illustrated in FIG. 2, a rotor magnet 56 is disposed at the rotor 55. The rotor magnet 56 is a tubular member magnetized such that adjacent parts alternately have opposite polarities, such as S, N, S, N, . . . , in the circumferential direction. The rotor magnet 56 is attached to an inner surface of the rotor 55 over the entire circumference.

The stator core 54 is fixed to the bottom plate part 12. The stator core 54 is formed by laminating a plurality of soft magnetic materials (for example, electromagnetic steel plates) having a thin plate shape in the axial direction, has an annular shape, and includes a plurality of pole teeth protruding outward in the radial direction. The plurality of pole teeth are provided at equal intervals in the circumferential direction, and the coil 53 is wound around each of the pole teeth. An inner peripheral surface of the rotor magnet 56 is opposed to an outer peripheral surface of the pole teeth of the stator core 54 with a gap.

By causing a current to flow through the coil 53 and switching the polarity, magnetic attractive forces and magnetic repulsion forces generated between the rotor magnet 56 and the pole teeth of the stator core 54 are switched. As a result, the rotor 55 rotates about the motor shaft 51.

When the rotor 55 rotates at a high speed, the lubricant filling the minute gap between the pair of bearing members 52 and the rotor 55 is pressurized by dynamic pressure generating grooves (not illustrated). As a result, a dynamic pressure is generated between the pair of bearing members 52 and the rotor 55, and due to the generated dynamic pressure, the rotor 55 rotates while being supported in a non-contact state with respect to the motor shaft 51. That is, the rotor 55 rotates while being supported in the non-contact state with respect to the motor shaft 51.

Clamp Member 70

The clamp member 70 is a disk-shaped member configured to fix the recording disks 60 to the rotating part 50a of the spindle motor 50. Specifically, the clamp member 70 is a member configured to fix the recording disks 60 to the rotor 55.

The clamp member 70 includes a clamp lower surface 72a provided in an outer edge region 72 of the clamp member 70, a plurality of outer through holes (first through holes) 74a provided in a central region (first region) 74 at an inner side of the outer edge region 72 in the radial direction, and a plurality of inner through holes (second through holes) 76a provided in an inner region (second region) 76 at an inner side of the central region 74 in the radial direction. The clamp member 70 includes a through hole at a further inner side of an inner region 76. The motor shaft 51 is inserted into the through hole.

The outer edge region 72 is a region having a predetermined width at the inner side in the radial direction from the outer edge of the clamp member 70. The inner region 76 is a region having a predetermined width at the outer side in the radial direction from the outer edge of the through hole of the clamp member 70. The central region 74 is a region between the outer edge region 72 and the inner region 76.

The clamp lower surface 72a is a surface facing downward at the outer edge region 72. With the clamp member 70 fixed to the rotor 55, the clamp lower surface 72a contacts the disk upper surface (upper surface) 62 of the recording disk 60 located at the uppermost position, and applies a downward force (hereinafter also referred to as a pressing force) to the disk upper surface 62. The clamp lower surface 72a extends over the entire circumferential direction and presses the disk upper surface 62 downward. In the present embodiment, the clamp lower surface 72a is formed flat.

The outer through holes 74a are provided at a first interval G1 in the circumferential direction at the central region 74, and the screws (fastening members) 90 fastened to the rotor 55 are inserted into the outer through holes 74a. The plurality of outer through holes 74a are provided at equal intervals (equal angle) with each other. The inner through holes 76a are provided at a second interval G2 in the circumferential direction in the inner region 76, and the screws 90 are inserted into the inner through holes 76a. The plurality of inner through holes 76a are provided at equal intervals (equal angle) with each other. As illustrated in FIG. 1, the outer through holes 74a and the inner through holes 76a are disposed so as to be shifted from each other in the circumferential direction. That is, the outer through holes 74a and the inner through holes 76a are disposed not overlapping with each other when viewed in the radial direction. An inner diameter R2 of the inner through hole 76a is smaller than an inner diameter R1 of the outer through hole 74a. The inner diameter R2 of the inner through hole 76a may be the same as the inner diameter R1 of the outer through hole 74a.

In the present embodiment, illustrated is a case where six outer through holes 74a and six inner through holes 76a are provided. However, the number of outer through holes 74a and the number of inner through holes 76a are not limited to the example.

Fixing of Clamp Member 70

The screws 90 are fastened to the rotor 55 with a torque of 0.15 N·m (1.5 kgf·cm) or more and 0.34 N·m (3.5 kgf·cm) or less. The screws 90 inserted into the inner through holes 76a are fastened to the rotor 55 with a larger torque than a torque applied to the screws 90 inserted into the outer through holes 74a. All the screws 90 May be fastened to the rotor 55 with the same torque.

When the screw 90 is fastened to the rotor 55, the fastening torque is transmitted to the outer edge region 72 at the outer side in the radial direction. The clamp lower surface 72a of the outer edge region 72 contacts the disk upper surface 62 and applies a downward pressing force to the recording disk 60. This applies a pressing force to the part of the recording disk 60 contacting the clamp lower surface 72a. As a result, the recording disks 60 are clamped from above and below by the clamp lower surface 72a and the flange upper surface 55b, and are fixed to the rotor 55.

Figure 3:
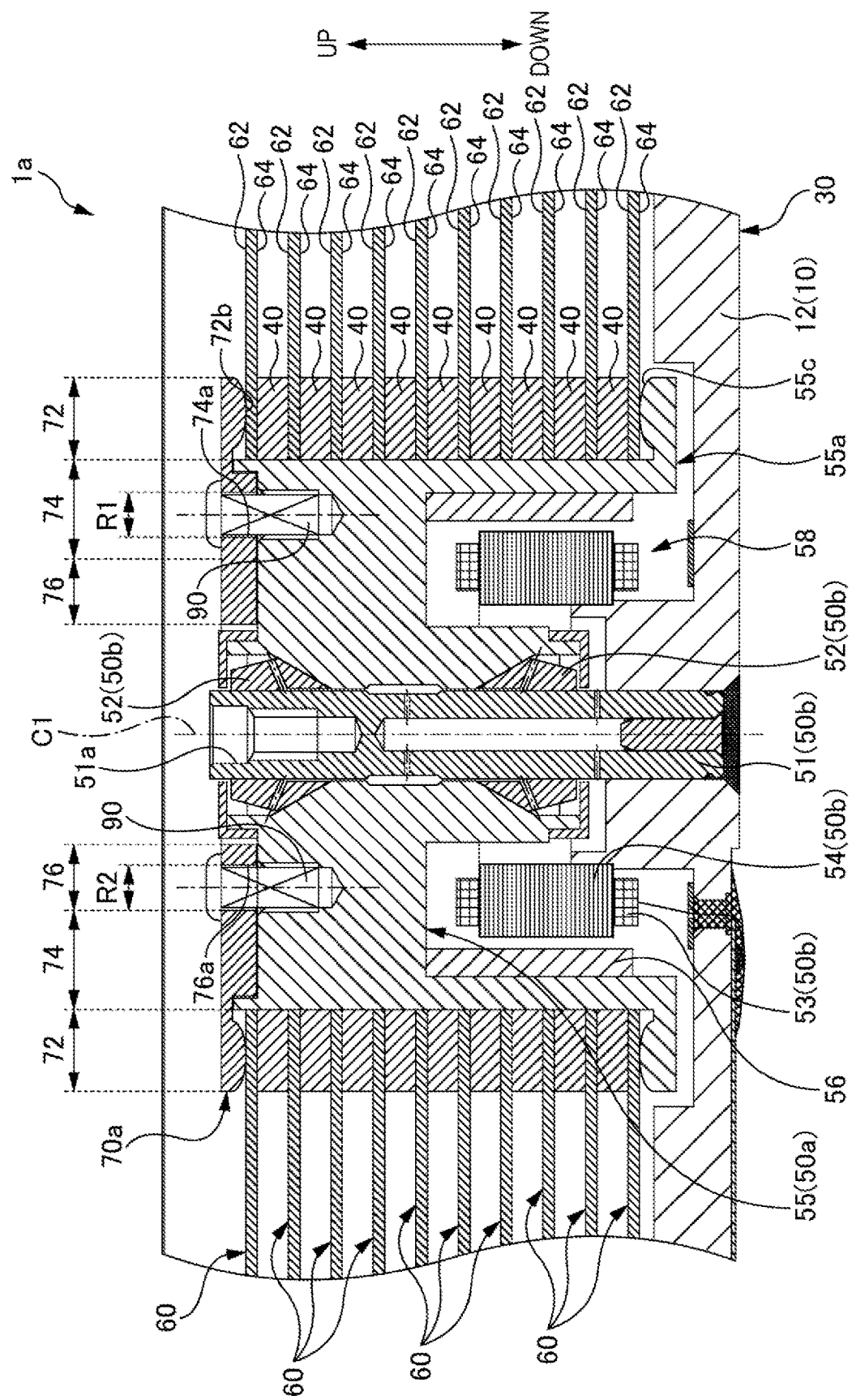
FIG. 3 is a cross-sectional view illustrating a variation of the hard disk drive device in FIG. 1.

Next, variations of the hard disk drive device 1 according to the embodiment of the disclosure will be described. FIG. 3 is a cross-sectional view illustrating a hard disk drive device 1a according to a variation of the hard disk drive device 1 in FIG. 1. The hard disk drive device 1a differs from the hard disk drive device 1 according to the embodiment in the shapes of a clamp lower surface 72b of a clamp member 70a and a flange upper surface 55c of a spindle motor 58.

More specifically, as illustrated in FIG. 3, in the hard disk drive device 1a according to the present variation, at least one of the clamp lower surface 72b or the flange upper surface 55c has a curved shape being convex toward the recording disk 60 in a cross-sectional view in the radial direction.

In the above-described embodiment, the following aspects are disclosed.

Aspect 1

The clamp members 70 and 70a are disk-shaped members configured to fix the recording disks 60 to the rotor 55 of the spindle motors 50 and 58. The clamp members 70 and 70a include the clamp lower surfaces 72a and 72b provided in the outer edge region 72 of the clamp members 70 and 70a and contacting the disk upper surface 62 of the recording disk 60 to apply a downward force to the disk upper surface 62, a plurality of outer through holes 74a provided at the first interval G1 in the circumferential direction in the central region 74 at the inner side in the radial direction from the outer edge regions 72 and a plurality of inner through holes 76a provided at the second interval G2 in the circumferential direction in the inner region 76 at the inner side in the radial direction from the central region 74. The screws 90 to be fastened to the rotor 55 are inserted into the outer through holes 74a, and the screws 90 are inserted into the inner through holes 76a.

According to the clamp members 70 and 70a of Aspect 1, the through holes (i.e., the outer through holes 74a and the inner through holes 76a) are provided in different regions (i.e., the central region 74 and the inner region 76) in the radial direction, allowing the circumferential interval between the through holes (i.e., the first interval G and the second interval G2) to be increased as compared with the case where the same number of through holes are provided in one region (e.g., the central region 74). This suppresses a decrease in rigidity of the clamp members 70 and 70a allowing deformation of the clamp members 70 and 70a due to the fastening torque to be suppressed in fastening the screws 90 to the rotor 55. Therefore, the fastening torque of the screws 90 can be reliably transmitted to the clamp lower surfaces 72a and 72b, and the recording disks 60 can be stably fixed to the rotor 55.

Since the through holes (i.e., the outer through holes 74a and the inner through holes 76a) are provided at a predetermined circumferential interval (i.e., the first interval G1 and the second interval G2) in different regions (i.e., the central region 74 and the inner region 76) in the radial direction, the number of through holes can be increased as compared with the case where the through holes are provided at the same interval (e.g., the first interval G1) in one region (e.g., the central region 74). This can suppress, in fastening the screws 90 to the rotor 55, a decrease in the pressing force applied from the clamp lower surfaces 72*a* and 72*b* to the disk upper surface 62 even when the fastening torque of each screw 90 (i.e., per screw) is reduced. Reducing the fastening torque per screw can avoid applying a local pressing force to the disk upper surface 62 and suppress deformation of the recording disk 60.

Aspect 2

In Aspect 1, the outer through holes 74*a* and the inner through holes 76*a* are disposed offset from each other in the circumferential direction.

According to the clamp members 70 and 70*a* of Aspect 2, the outer through holes 74*a* and the inner through holes 76*a* do not overlap in the radial direction. Thus, compared to the case where the outer through holes 74*a* and the inner through holes 76*a* are disposed overlapping in the radial direction, the interval between the outer through hole 74*a* and the inner through hole 76*a* adjacently disposed can be increased. This suppresses a decrease in rigidity of the clamp members 70 and 70*a* and thus can reliably transmit the fastening torque of the screws 90 to the clamp lower surfaces 72*a* and 72*b* and stably fix the recording disks 60 to the rotor 55.

The fastening torque of the screws 90 fastened to the rotor 55 through the outer through holes 74*a* and the fastening torque of the screws 90 fastened to the rotor 55 through the inner through holes 76*a* are transmitted to the clamp lower surfaces 72*a* and 72*b* without interfering with each other. Therefore, the pressing force applied from the clamp lower surfaces 72*a* and 72*b* to the disk upper surface 62 can be made uniform or substantially uniform in the circumferential direction. As a result, applying a local pressing force to the disk upper surface 62 can be avoided, and deformation of the recording disk 60 can be suppressed.

Aspect 3

In Aspect 1 or 2, the inner diameter R2 of the inner through holes 76*a* is smaller than the inner diameter R1 of the outer through holes 74*a*.

According to the clamp members 70 and 70*a* of Aspect 3, a decrease in rigidity of the clamp members 70 and 70*a* is suppressed compared to the case where the inner diameter R2 of the inner through hole 76*a* is the same as the inner diameter R1 of the outer through hole 74*a*.

Therefore, the fastening torque of the screws 90 can be reliably transmitted to the clamp lower surfaces 72*a* and 72*b*, and the recording disks 60 can be stably fixed to the rotor 55.

Aspect 4

The hard disk drive devices 1 and 1*a* include the housing 30, the spindle motors 50 and 58 respectively disposed inside the housing 30, the recording disks 60 disposed inside the housing 30 and rotated by the spindle motors 50 and 58, the clamp members 70 and 70*a* disposed inside the housing 30, configured to fix the recording disks 60 to the rotor 55 of the spindle motors 50 and 58, and having a disk shape and the access part 80 disposed inside the housing 30 and configured to record data on the recording disks 60 and read data recorded on the recording disks 60. The clamp members 70 and 70*a* are disk-shaped members configured to fix the recording disks 60 to the rotor 55 of the spindle motors 50 and 58, respectively. The clamp members 70 and 70*a* include the clamp lower surfaces 72*a* and 72*b* provided in the outer edge region 72 of the clamp members 70 and 70*a*, contacting the disk upper surface 62 of the recording disk 60, and configured to apply a downward force to the disk upper surface 62, a plurality of outer through holes 74*a* provided at the first interval G1 in the circumferential direction in the central region 74 at the inner side of the outer edge region 72 in the radial direction, and a plurality of inner through holes 76*a* provided at the second interval G2 in the circumferential direction in the inner region 76 at the inner side in the radial direction from the central region 74. The screws 90 to be fastened to the rotor 55 are inserted into the outer through holes 74*a*, and the screws 90 are inserted into the inner through holes 76*a*.

According to the hard disk drive devices 1 and 1*a* of Aspect 4, the through holes (i.e., the outer through holes 74*a* and the inner through holes 76*a*) are provided in different regions (i.e., the central region 74 and the inner region 76) in the radial direction, allowing the circumferential interval between the through holes (i.e., the first interval G and the second interval G2) to be increased as compared with the case where the same number of through holes are provided in one region (e.g., the central region 74). This suppresses a decrease in rigidity of the clamp members 70 and 70*a*, allowing deformation of the clamp members 70 and 70*a* due to the fastening torque to be suppressed in fastening the screws 90 to the rotor 55. Therefore, the fastening torque of the screws 90 can be reliably transmitted to the clamp lower surfaces 72*a* and 72*b*, and the recording disks 60 can be stably fixed to the rotor 55.

Since the through holes (i.e., the outer through holes 74*a* and the inner through holes 76*a*) are provided at a predetermined circumferential interval (i.e., the first interval G1 and the second interval G2) in different regions (i.e., the central region 74 and the inner region 76) in the radial direction, the number of through holes can be increased as compared with the case where the through holes are provided at the same interval (e.g., the first interval G1) in one region (e.g., the central region 74). This can suppress, in fastening the screws 90 to the rotor 55, a decrease in the pressing force applied from the clamp lower surfaces 72*a* and 72*b* to the disk upper surface 62 even when the fastening torque of each screw 90 (i.e., per screw) is reduced. Reducing the fastening torque per screw can avoid applying a local pressing force to the disk upper surface 62 and suppress deformation of the recording disk 60.

In the hard disk drive devices 1 and 1*a*, the access part 80 applies magnetism to the recording disk 60 and reads magnetism from the recording disk 60 in a state where an extremely narrow gap is maintained between the access part 80 and the rotating recording disk 60.

Therefore, if the recording disk 60 is deformed, an error may occur when the access part 80 records data on the recording disk 60 and reads data recorded on the recording disk 60. In this respect, the hard disk drive devices 1 and 1*a* of Aspect 4 can suppress deformation of the recording disk 60, allowing errors in data recording and data reading to be avoided.

Aspect 5

In Aspect 4, the outer through holes 74*a* and the inner through holes 76*a* are disposed offset from each other in the circumferential direction.

According to the hard disk drive devices 1 and 1*a* of Aspect 5, the outer through holes 74*a* and the inner through holes 76*a* do not overlap in the radial direction. Thus, compared to the case where the outer through holes 74*a* and the inner through holes 76*a* are disposed overlapping in the radial direction, the interval between the outer through hole 74*a* and the inner through hole 76*a* adjacently disposed can be increased. This suppresses a decrease in rigidity of the clamp members 70 and 70*a* and thus can reliably transmit the fastening torque of the screws 90 to the clamp lower surfaces 72*a* and 72*b* and stably fix the recording disks 60 to the rotor 55.

The fastening torque of the screws 90 fastened to the rotor 55 through the outer through holes 74*a* and the fastening torque of the screws 90 fastened to the rotor 55 through the inner through holes 76*a* are transmitted to the clamp lower surfaces 72*a* and 72*b* without interfering with each other. Therefore, the pressing force applied from the clamp lower surfaces 72*a* and 72*b* to the disk upper surface 62 can be made uniform or substantially uniform in the circumferential direction. As a result, applying a local pressing force to the disk upper surface 62 can be avoided, and deformation of the recording disk 60 can be suppressed. Therefore, an error when recording and reading data can be avoided.

Aspect 6

In Aspect 4 or 5, the inner diameter R2 of the inner through holes 76*a* is smaller than the inner diameter R1 of the outer through holes 74*a*.

According to the hard disk drive devices 1 and 1*a* of Aspect 6, a decrease in rigidity of the clamp members 70 and 70*a* is suppressed compared to the case where the inner diameter R2 of the inner through hole 76*a* is the same as the inner diameter R1 of the outer through hole 74*a*.

Therefore, the fastening torque of the screws 90 can be reliably transmitted to the clamp lower surfaces 72*a* and 72*b*, and the recording disks 60 can be stably fixed to the rotor 55.

Aspect 7

In any one of Aspects 4 to 6, the screws 90 are fastened to the rotor 55 with a torque of 0.15 N·m or more and 0.34 N·m or less.

According to the hard disk drive devices 1 and 1*a* of Aspect 7, the number of through holes can be increased compared to the case where through holes are provided at the same interval (e.g., the first interval G1) in one region (e.g., the central region 74). This can suppress, in fastening the screws 90 to the rotor 55, a decrease in the pressing force applied from the clamp lower surfaces 72*a* and 72*b* to the disk upper surface 62 even when the fastening torque of each screw 90 (i.e., per screw) is reduced. More specifically, in the related art, screws are fastened with a torque higher than 0.34 N·m per screw. On the other hand, according to Aspect 7, the screws 90 can be fastened with a torque of 0.15 N·m or more and 0.34 N·m or less.

Aspect 8

In any one of Aspects 4 to 7, the screws 90 inserted into the inner through holes 76*a* are fastened to the rotor 55 with a larger torque than a torque applied to the screws 90 inserted into the outer through holes 74*a*.

According to the hard disk drive devices 1 and 1*a* of Aspect 8, the pressing force transmitted to the disk upper surface 62 by the fastening torque of the screws 90 passing through the outer through holes 74*a* can be made equal or substantially equal to the pressing force transmitted to the disk upper surface 62 by the fastening torque of the screws 90 passing through the inner through holes 76*a*. Therefore, the pressing force applied from the clamp lower surfaces 72*a* and 72*b* to the disk upper surface 62 can be made uniform or substantially uniform in the circumferential direction. As a result, applying a local pressing force to the disk upper surface 62 can be avoided, and deformation of the recording disk 60 can be suppressed. Therefore, an error when recording and reading data can be avoided.

Aspect 9

In any one of Aspects 4 to 8, the spindle motor 58 includes the flange part 55*a* configured to support the recording disk 60 from below and having a disk shape, and the flange part 55*a* includes the flange upper surface 55*c* contacting the disk lower surface 64 of the recording disk 60. At least one of the clamp lower surface 72*b* or the flange upper surface 55*c* has a curved shape protruding toward the recording disk 60 in a cross-sectional view in the radial direction.

According to the hard disk drive devices 1 and 1*a* of Aspect 9, even when the recording disk 60 is bent by the pressing force, the contact surface between the disk upper surface 62 of the recording disk 60 located at the uppermost part and the clamp lower surface 72*b* moves along the curved shape of the clamp lower surface 72*b*. Similarly, the contact surface between the disk lower surface 64 of the recording disk 60 located at the lowermost part and the flange upper surface 55*c* moves along the curved shape of the flange upper surface 55*c*. Therefore, even when the recording disk 60 is bent, both the contact surfaces maintain a constant distance from the center axis line C1 in the circumferential direction. Therefore, the pressing force applied from the clamp lower surface 72*b* to the disk upper surface 62 and the force applied from the flange upper surface 55*c* to the disk lower surface 64 can be made uniform or substantially uniform in the circumferential direction. As a result, applying a local force to the disk upper surface 62 and the disk lower surface 64 can be avoided, and deformation of the recording disk 60 can be suppressed. Therefore, an error when recording and reading data can be avoided.

While a preferred embodiment of the disclosure has been described above, the disclosure is not limited to the clamp members 70 and 70*a* and the hard disk drive devices 1 and 1*a* according to the embodiment described above, and includes various aspects included in concepts and claims of the disclosure. Further, the respective configurations may be selectively combined as appropriate so as to achieve the object and the effects described above. For example, a shape, a material, an arrangement, a size, and the like of the respective components in the embodiment described above may be changed as appropriate according to a specific aspect of the disclosure.

For example, in the above-described present embodiment, an example of the spindle motors 50 and 58 provided with the motor shaft 51 as a component separate from the base 10 has been described. However, the motor shaft 51 May be die cast integrally with the base 10 as a component of the base 10.

In the above-described embodiment, an example of the spindle motors 50 and 58 provided with the motor shaft 51 as a component of the stationary part 50*b* has been described. That is, an example of the motor shaft 51 being fixed to the bottom plate part 12 of the base 10 by press fitting or the like, and the pair of bearing members 52 being fixed to an outer peripheral surface of the motor shaft 51 has been described. However, the spindle motor may have a motor shaft as a component of the rotating part 50*a*. That is, the spindle motor may be configured by fixing a bearing sleeve (not illustrated) to a base and fixing a rotor to an outer peripheral surface of a motor shaft rotatably supported by the bearing sleeve.

In the above-described embodiment, a case where the outer through holes 74*a* and the inner through holes 76*a* are disposed at equal intervals (at equal angles) has been described.

However, the outer through holes 74*a* and the inner through holes 76*a* may not be disposed at equal intervals (equal angles).

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A clamp member configured to fix a recording disk to a rotating part of a spindle motor and having a disk shape, the clamp member comprising:
a clamp lower surface provided in an outer edge region of the clamp member, contacting an upper surface of the recording disk, and configured to apply a downward force to the upper surface;
a plurality of first through holes provided at a first interval in a circumferential direction in a first region at an inner side in a radial direction from the outer edge region, fastening members to be fastened to the rotating part being inserted into the first through holes; and
a plurality of second through holes provided at a second interval in the circumferential direction in a second region at the inner side in the radial direction from the first region, the fastening members being inserted into the second through holes.

2. The clamp member according to claim 1, wherein the first through holes and the second through holes are disposed offset from each other in the circumferential direction.

3. The clamp member according to claim 1, wherein an inner diameter of the second through holes is smaller than an inner diameter of the first through holes.

4. A hard disk drive device, comprising:
a housing;
a spindle motor disposed inside the housing;
a recording disk disposed inside the housing and rotated by the spindle motor;
a clamp member disposed inside the housing, configured to fix the recording disk to a rotating part of the spindle motor, and having a disk shape; and
an access part disposed inside the housing and configured to record data on the recording disk and read data recorded on the recording disk, wherein
the clamp member comprises
a clamp lower surface provided in an outer edge region of the clamp member, contacting an upper surface of the recording disk, and configured to apply a downward force to the upper surface,
a plurality of first through holes provided at a first interval in a circumferential direction in a first region at an inner side in a radial direction from the outer edge region, fastening members to be fastened to the rotating part being inserted into the first through holes; and
a plurality of second through holes provided at a second interval in the circumferential direction in a second region at an inner side in the radial direction from the first region, the fastening members being inserted into the second through holes.

5. The hard disk drive device according to claim 4, wherein the first through holes and the second through holes are disposed offset from each other in the circumferential direction.

6. The hard disk drive device according to claim 4, wherein an inner diameter of the second through holes is smaller than an inner diameter of the first through holes.

7. The hard disk drive device according to claim 4, wherein the fastening members are fastened to the rotating part with a torque of 0.15 N·m or more and 0.34 N·m or less.

8. The hard disk drive device according to claim 7, wherein the fastening members inserted into the second through holes are fastened to the rotating part with a larger torque than a torque applied to the fastening members inserted into the first through holes.

9. The hard disk drive device according to claim 4, wherein
the spindle motor comprises a flange part configured to support the recording disk from below and having a disk shape,
the flange part comprises a flange upper surface contacting a lower surface of the recording disk, and
at least one of the clamp lower surface or the flange upper surface has a curved shape protruding toward the recording disk in a cross-sectional view in a radial direction.

\* \* \* \* \*